United States Patent [19]

Watanabe et al.

[11] Patent Number: 4,999,217
[45] Date of Patent: Mar. 12, 1991

[54] PROCESS FOR PRODUCING MAGNETIC RECORDING MEDIUM

[75] Inventors: Yukio Watanabe, Machida; Shigeru Hashimoto; Nobuyuki Hosoi, both of Yokohama, all of Japan

[73] Assignee: Canon Kabushiki Kaisha, Tokyo, Japan

[21] Appl. No.: 306,210

[22] Filed: Feb. 3, 1989

Related U.S. Application Data

[63] Continuation of Ser. No. 75,989, Jul. 21, 1987, abandoned.

[30] Foreign Application Priority Data

Jul. 29, 1986 [JP] Japan ................................ 61-176663

[51] Int. Cl.$^5$ ............................................. B05D 3/14
[52] U.S. Cl. ..................................... 427/48; 427/128; 427/130; 428/64; 428/694; 428/900
[58] Field of Search ................................ 427/128–132, 427/48; 428/64, 900, 694

[56] References Cited

U.S. PATENT DOCUMENTS 4,271,782 6/1981 Bate et al. ........................ 427/48 X
4,518,627 5/1987 Foley et al. ........................ 427/48

Primary Examiner—Bernard Pinalto
Attorney, Agent, or Firm—Fitzpatrick, Cella, Harper & Scinto

[57] ABSTRACT

A process for producing a magnetic recording medium includes coating a nonmagnetic substrate with a magnetic paint and applying a rotating magnetic field for orientation to the raw fabric with magnetic paint in a yet unsolidified state on the substrate, in which a magnetic field is applied to the above raw fabric so that the magnetic lines of force may pass from the back face to the front surface or from the front surface to the back surface of the raw fabric before application of the rotating magnetic field for orientation, thereby effecting preliminary orientation.

8 Claims, 4 Drawing Sheets

PROCESS FOR PRODUCING MAGNETIC RECORDING MEDIUM

This application is a continuation of application Ser. No. 075,989, filed July 21, 1987, now abandoned.

BACKGROUND OF THE INVENTION

1. Field of the Invention

This invention relates to a disc-shaped magnetic recording medium and a process for producing the same.

2. Related Background Art

In recent years, a flexible disc-shaped magnetic recording medium has been popularly used, such as a flexible disc, as a large volume memory medium for a computer or as a magnetic sheet for a still video camera (video, floppy), etc.

A magnetic recording medium, not limited to a flexible disc or magnetic disc, but also including magnetic tape, performs reading and writing by sliding a magnetic head on a medium. Accordingly, when the magnetic layer of these magnetic recording media is to be formed, magnetic powder is preferably oriented along the sliding direction of the head. In other words, the magnetic powder is preferably oriented in the running direction of a magnetic tape, while in the circumferential direction in a flexible disc or magnetic sheet.

Generally speaking, when a flexible magnetic recording medium is produced by coating a magnetic paint, a base film carrying a magnetic paint thereon passes through two rotating rollers with a gap slightly broader than the base film being formed therebetween. Accordingly, the magnetic powder is oriented in the running direction. This is called mechanical orientation. In general, magnetic powder with greater shape anisotropy, namely, greater axis ratio, is more susceptible to mechanical orientation, and greater angular ratio is obtained as the result of such orientation.

In the case of a magnetic tape, when the product, as coated above by use of a magnetic powder with great axis ratio, is cut into bands, a magnetic tape oriented in the magnetic head running direction is obtained by mechanical orientation. However, when a flexible disc or magnetic sheet is prepared by punching this out into a disc, while the magnetic head slides along the circumference, because of the greater residual magnetization in the coated direction due to mechanical orientation, the envelope wave form does not become constant, thus creating the problem that the output will periodically fluctuate.

For solving this problem, there have been some proposals regarding the method for orientation in a concentric shape, but they have not yet been practically applied. In the presently commercially available floppy disc or video floppy, devices have been made to weaken mechanical orientation in the coating step, or the envelope is made as flat as possible by use of a magnetic powder with small axis ratio. However, since the magnetic powder is not oriented circumferentially, there were problems in that angular ratio became worse, and the residual magnetization was smaller as compared with the oriented magnetic powder, as in a magnetic tape. Accordingly, in such a disc-shaped magnetic recording medium, the track width is required to be broadened for obtaining sufficient output. However, this prevents higher densification.

For example, by taking the example of a metal tape, the axis ratio of the metal magnetic powder can be varied from about 5 to 15, but ordinarily one with an axis ratio of about 10 is used. The angular ratio of the tape with the use of a magnetic powder of such long needles, which is about 0.55 in the case of non-orientation, becomes about 0.6 to 0.65 in the longer direction of the coating line by application of mechanical orientation. Further, as disclosed in Japanese Patent Publication No. 2536/1959, if magnetic orientation is imparted by use of a device in which a sheet coated with a magnetic paint before solidification passes between two plate magnets with the same magnetic poles being opposed to each other, the angular ratio increased to about 0.8 to 0.85. On the other hand, the angular ratio in the circumferential direction of a metal video floppy suppressed in magnetic field orientation is essentially the same as the nonoriented tape, namely about 0.55 to 0.65 and the output is lowered by about 3 dB as compared with the tape imparted with magnetic orientation.

Except for the problems as described above, as an example of a magnetic recording medium circumferentially oriented, there is also a hard disc obtained by spin coating. However, in the case of spin coating, since individual recording media is applied with coating one sheet by one sheet after formation of the support in a shape of a disc, bulk productivity is poor, thus involving the problem of increased cost.

A method for orienting circumferentially with a magnetic field externally applied is disclosed in Japanese Patent Publication No. 23626/1965. According to this method, rotatory magnetic pole surfaces are moved toward each other under the state where the magnetic paint is not solidified, and the magnetic powder is oriented in concentric circles while maintaining the rotational axis lines relatively stationary, and then separated from each other. In Example of this method, the rotatory magnetic field is imparted from one side of the raw fabric, but in the case of a tape, as previously shown in Japanese Patent Publication No. 2536/1959, it is better to provide a rotatory magnetic pole surface having the same magnetic pole on the opposite side as opposed thereto with the raw fabric sandwiched therebetween. A conceptional illustration of such a device is shown in Japanese Laid-open Patent Publication No. 62505/1978.

However, in the orientation method according to the above rotatory magnetic field, the magnetic field orienting force is basically the same at any position on the circumference. On the other hand, as previously mentioned, the mechanical orientation force is strong in the raw fabric running direction. Therefore a difference remains between the orientation in the direction in parallel to the raw fabric running direction and the orientation in the direction perpendicular to the running direction within the raw fabric plane even after application of the magnetic field. Accordingly, although this difference can be smaller by use of a magnetic powder with smaller axis ratio (needle shape ratio), the angular ratio after orientation increases as the shape anisotropy increases. Therefore, for enhancing residual magnetic flux density, and accordingly for generally enhancing recording density, it is better to use a magnetic powder with great axis ratio (needle shape ratio). In that case, there ensues a problem that directional difference becomes further increased in the orientation degree of mechanical orientation.

For eliminating the drawbacks of the prior art as described above, the present Applicant has filed Japanese Patent Applications Nos. 250853/1985 and 258677/1985, and further filed U.S. Pat. Ser. No.

928,420, claiming priority based on the above two Japanese Patent Applications. The gist of these applications resides in producing a magnetic recording medium, comprising coating a nonmagnetic substrate with a magnetic paint and applying a rotating magnetic field for orientation to the magnetic paint in a yet unsolidified state on the substrate; the improvement wherein the magnetic field for orientation is stronger in a direction perpendicular to the moving direction of the substrate than in the moving direction.

SUMMARY OF THE INVENTION

An object of the present invention is to eliminate the drawbacks of the prior art as described above and also to produce a disc-shaped magnetic recoding medium having a constant orientation degree in the circumferential direction without changing the magnetic field applied for orientation of magnetic powder in the running direction of the substrate from that applied in the direction perpendicular to the running direction and yet without influence from mechanical orientation. Further it is an object to have a high orientation degree equal to the longer direction orientation in magnetic tape.

The process according to the present invention comprises coating a nonmagnetic substrate with a magnetic paint and applying a rotating magnetic field for orientation to the raw fabric with magnetic paint in a yet unsolidified state on the substrate, in which a magnetic field is applied to the above substrate so that the magnetic lines of force may pass from the back surface to the front surface or from the front surface to the back surface of said raw fabric prior to application of said rotating magnetic field for orientation, thereby effecting preliminary orientation.

DETAILED DESCRIPTION OF THE PREFERRED EMBODIMENTS

Figure 1:
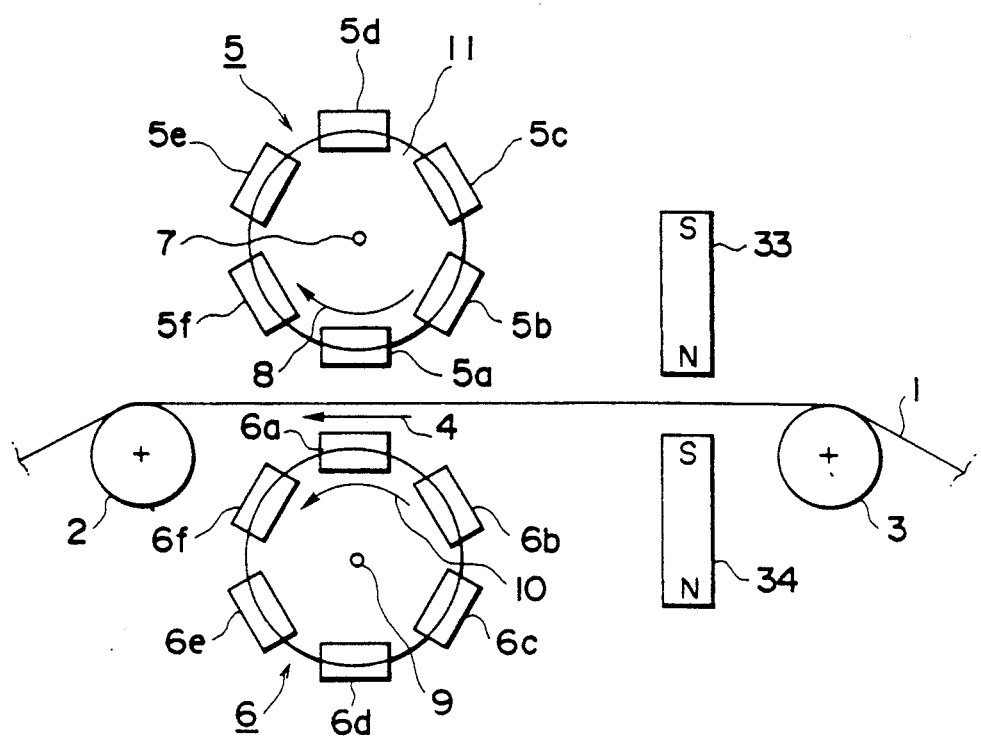
FIG. 1 is a side view showing an example of a device for practicing the production process of the present invention.

The raw fabric 1 shown in FIG. 1 comprises a magnetic paint coated on a nonmagnetic substrate. By cutting the raw fabric a disc shape or a tape shape, etc. after solidification, the magnetic paint becomes a desired magnetic recording medium. The raw fabric 1, as shown in FIG. 1, has magnetic paint not solidified under the state when conveyed with conveying rollers 2, 3. Under this state, the raw fabric 1 is moving at a constant speed in the direction of the arrowhead 4. In conveying the raw fabric 1, the conveying rollers 2, 3 are brought into contact with the nonmagnetic substrate. Above and below the raw fabric 1 are provided rotating members for orientation 5, 6. The rotating members for orientation 5, 6 may be either above or below the raw fabric 1. The rotating member for orientation 5 has rotatory magnetic poles 5a, 5b, 5c, 5d, 5e and 5f arranged on the side face of the rotating drum 11. The rotating drum 11 rotates around the rotational axis of the rotational center 7, rotating at a constant speed in the direction of the arrowhead 8, with the circumferential speed of the rotatory magnetic poles 5a through 5f being equal to the running speed of the raw fabric 1.

The rotating member 6 for orientation also has vibrating rotatory magnetic poles 6a, 6b, 6c, 6d, 6e and 6f arranged on the side face of the rotating drum 12 similar to the rotating member for orientation 5, and rotates around the rotational axis 9 in the direction of the arrowhead 10 opposite to the rotating member for orientation 5, at a rotational speed equal to the rotating drum 11. The rotatory magnetic poles 5a to 5f and 6a to 6f are rotating in one direction. By rotation of the rotatory magnetic poles 5a to 5f and 6a to 6f, a rotating magnetic field for orientation is applied on the raw fabric 1.

The rotatory magnetic poles may be provided only on one surface of the magnetic recording medium raw fabric with undried magnetic layer, but it is preferable to provide them on the opposite surface with the raw fabric sandwiched therebetween as shown in FIG. 1. In this case, when the respective rotatory magnetic poles are equidistant from the raw fabric, the arrangement and movement (change in time) of the magnetic poles are most preferably made in mirror image relationship with respect to the raw fabric. Under such a state, the magnetic lines of force become parallel to the raw fabric near the raw fabric, whereby magnetic powder in the magnetic paint is oriented in parallel to the nonmagnetic substrate.

Upstream of the raw fabric running direction of the rotating members for orientation 5, 6 are arranged a pair of magnets 33, 34. The magnets 33, 34 are arranged above and below the raw fabric 1, respectively. The magnets 33, 34 are arranged as opposed to each other with the N-pole and the S-pole sandwiching the raw fabric 1 therebetween.

By these magnets 33, 34, a magnetic field is applied so that the magnetic lines of force may pass from the back surface to the front surface or from the front surface to the back surface of the raw fabric 1 before the rotating magnetic field for orientation is applied to the raw fabric 1, thus effecting preliminary orientation.

By the preliminary orientation by the magnets 33, 34, mechanical orientation of the magnetic powder is obviated, and orientation with the rotatory magnetic poles can be performed without mechanical orientation. The magnetic powder should be preferably oriented substantially in the perpendicular direction to the nonmagnetic substrate surface by the magnets 33, 34. These magnets 33, 34 may be either permanent magnets or electromagnets. The strength of the magnetic field for preliminary orientation should preferably be 3,000 Oe or higher, in practice, most preferably 3,000 to 5,000 Oe.

Figure 2:
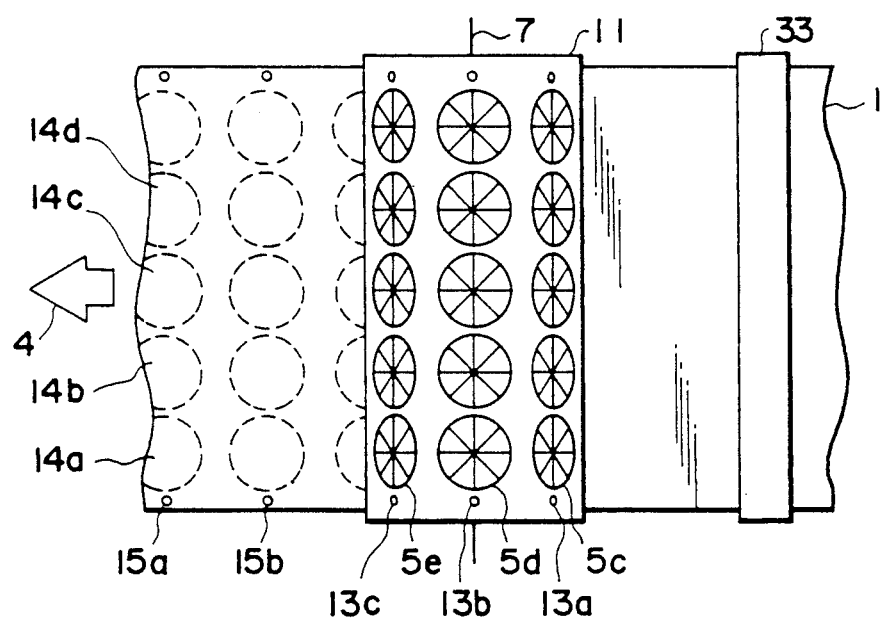
FIG. 2 is a plan view of the device shown in FIG. 1.

FIG. 2 is a plan view of the magnetic orientation device shown in FIG. 1. By rotation of the rotatory poles 5a to 5f and 6a to 6f held on the rotating drum 11, there occurs in in the unsolidified magnetic paint on the raw fabric 1 running in the direction of the arrowhead 4, a circumferential oriented pattern of 14a, 14b, 14c, 14d. For punching the disc with good precision from within the circumferential pattern, marks for positioning 15b, and the like are also written on both ends of the raw fabric 1, and these marks are recorded mechanically by means of marking devices 13a, 13b, 13c, and the like provided on, for example, the rotating drum 11 in constant positional relationship with the rotatory poles, or physically with light, heat, magnetic force, etc. or chemically such as by ink jet, etc. The magnets 33, 34 should be preferably arranged with widths slightly greater than that of the raw fabric 1.

Figure 3:
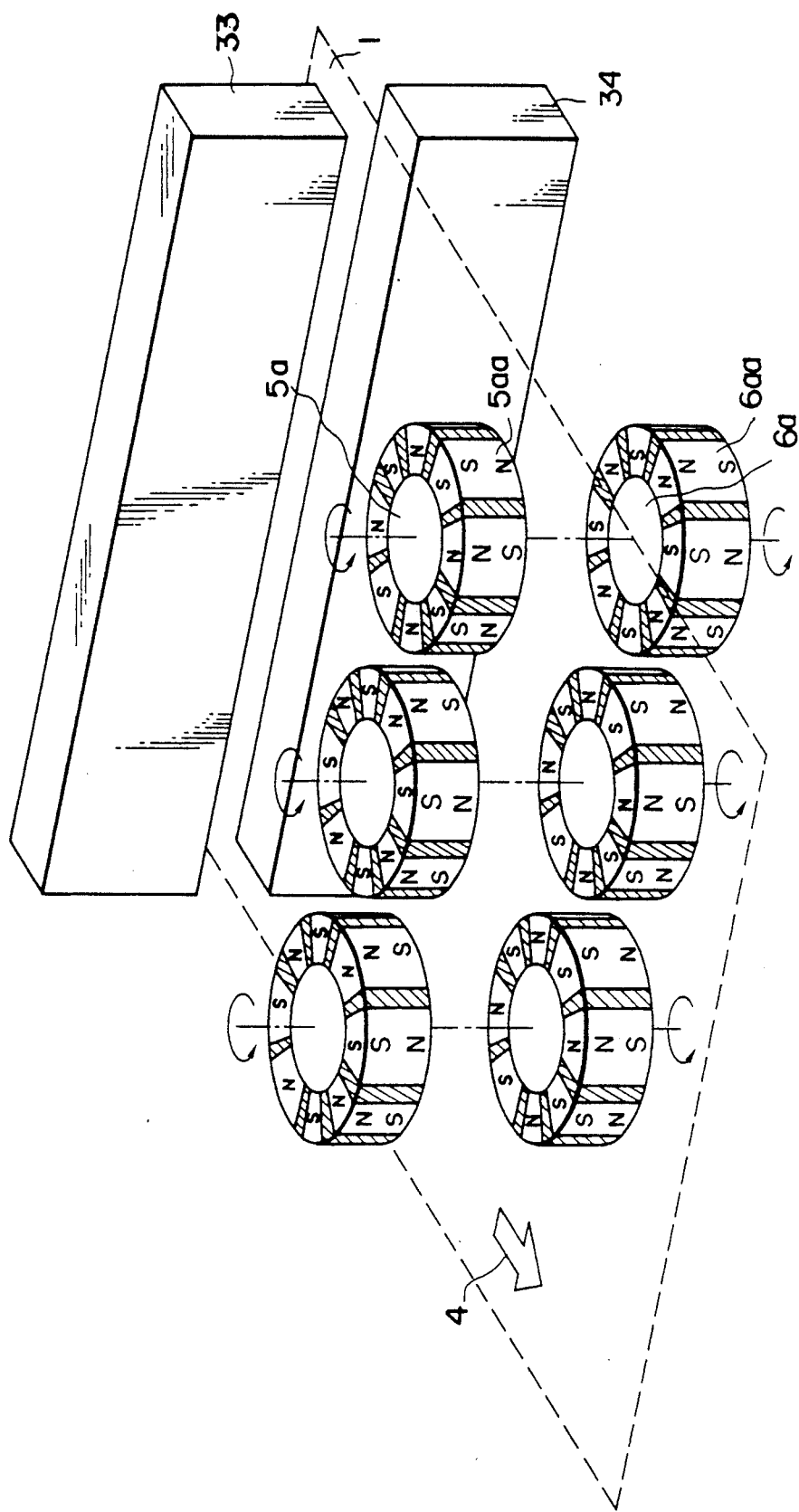
FIG. 3 is a perspective view showing the positional relationship of the rotatory magnetic pole, the magnet and the substrate.

FIG. 3 shows the positional relationship of the rotatory magnetic poles taken out from the positions of rotatory magnetic poles 5a and 6a in FIG. 1 with the raw fabric 1. The raw fabric 1 moves in the direction of the arrowhead 4 between the rotating rotatory magnetic poles 5a and 6a. The rotatory magnetic pole 5a or 6a is provided radially with magnetic poles 5aa or 6aa by use of a permanent magnet. The magnetic pole 5aa and the magnetic pole 6aa in symmetrical position with the raw fabric 1 as the symmetical surface are arranged so that N-pole and N-pole or S-pole and S-pole may be opposed to each other. The magnetic pole provided on the rotatory magnetic poles 5a to 5f and 6a to 6f may be only one.

FIG. 4A to FIG. 4D show other embodiments of rotatory magnetic poles.

Figure 4A:
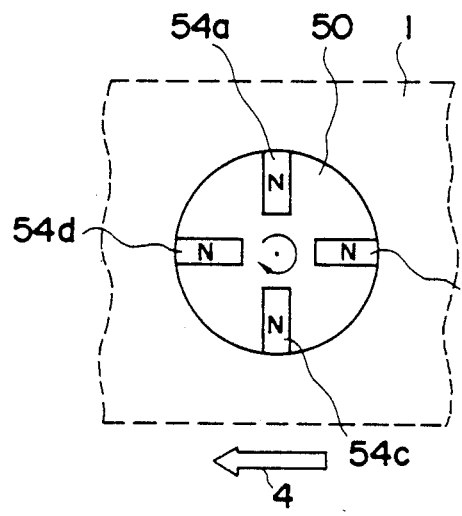
FIGS. 4A to 4D are plan views showing an example of the rotatory magnetic pole to be used in the device shown in FIG. 1.
Figure 4B:
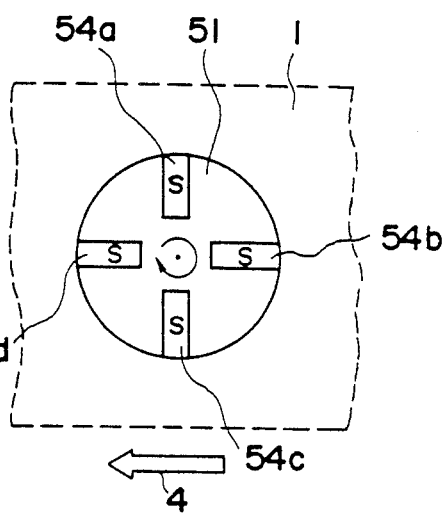
Figure 4C:
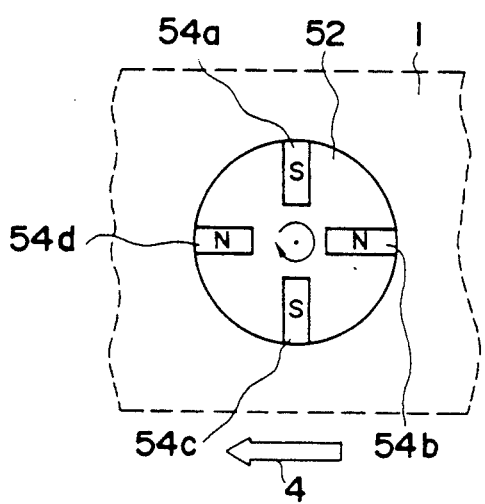
Figure 4D:
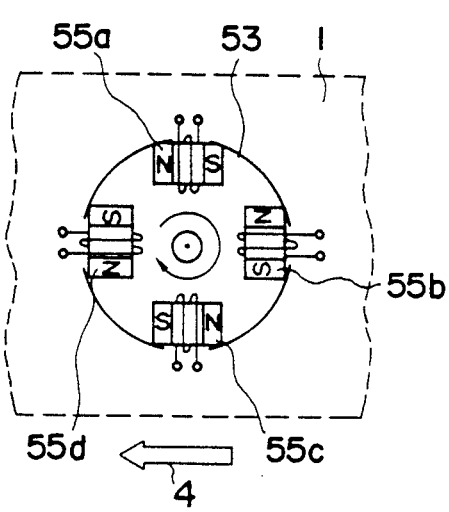

In FIGS. 4A to 4C, permanent magnets are used for magnetic poles 54a to 54f, while in FIG. 4D, electromagnets are used for magnetic poles 55a to 55d. Various arrangements of the magnetic poles may be considered, typically the rotatory magnet to be used in circumferential magnetic field orientation in flexible magnetic disc known in the art (Japanese Patent Publication No. 23626/1965) and the arrangement in the case of hard disc (Japanese Laid-open Patent Publication Nos. 10605/1975, 47606/1979), etc. Also, a rotatory magnetic field generator like a stator in a flat type motor (Japanese Laid-open Patent Publication No. 5007/1974) may be used. In the case of using a rotatory magnetic field generator, the magnetic poles are not required to be rotated. The polarity of the magnetic pole appearing on one surface of the rotatory pole 5a or 6a may be only N-pole or S-pole, as shown in FIG. 4A and FIG. 4B, or alternatively a combination of N-pole and S-pole as shown in FIG. 4C and FIG. 4D.

Figure 5:
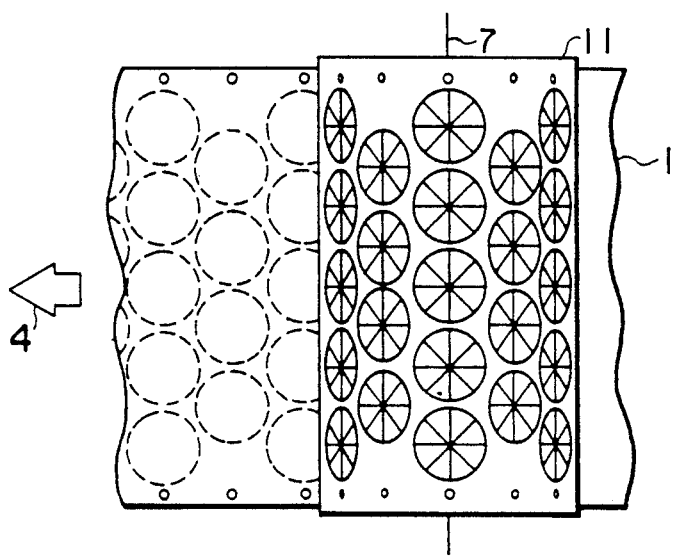
FIG. 5 is a plan view of another example of the device for practicing the production process of the present invention.

FIG. 5 is a plan view of another magnetic field orientation device, and represents an arrangement different from the example in FIG. 2 of the rotatory magnetic poles on the rotating drum 11.

Figure 6:
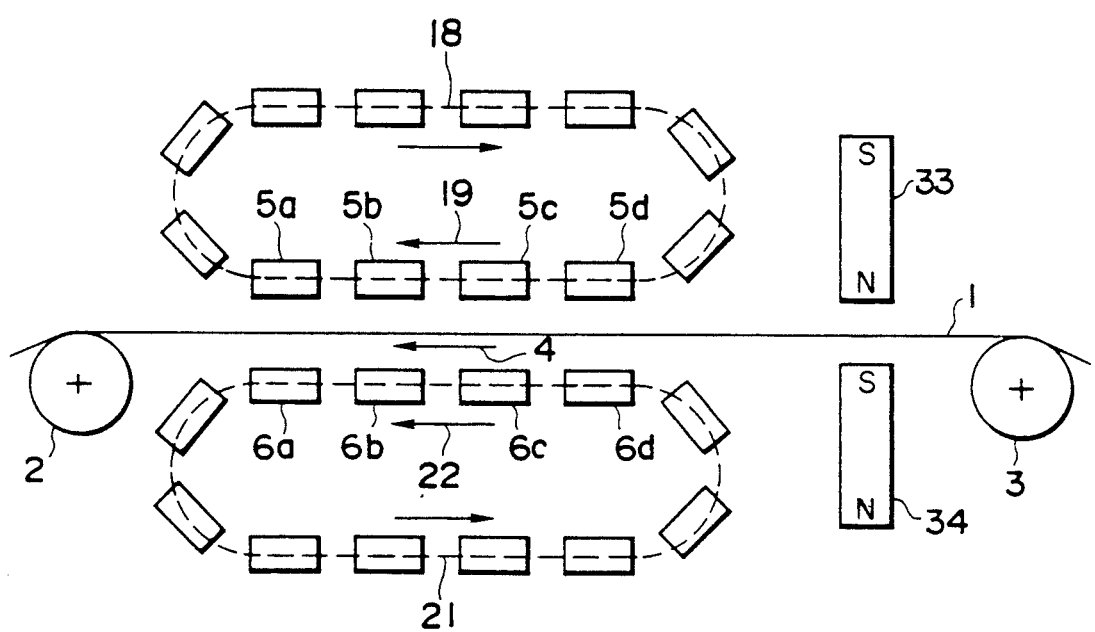
FIG. 6 is a side view showing another example of the device for practicing the process of the present invention.

FIG. 6 is an example in the case of maintaining the state of imparting a magnetic field for orientation while being stationary relative to the raw fabric for a longer time than the example shown in the above FIG. 1. In this example, rotatory magnetic poles 5a, 5b, 5c, and the like and 6a, 6b, 6c and the like are held by running devices 18, 21 in the shape of a belt conveyor or caterpillar provided respectively with the raw fabric 1 being sandwiched therebetween, and are running in the directions of the arrowheads 19, 22, respectively. The running speed is equal to the running speed of the raw fabric. On the upstream side of the raw fabric running direction of the running devices 18, 21 are arranged magnets 33, 34.

In the following, the production process of the present invention is described in detail.

A magnetic paint comprising a dispersed mixture of 100 parts by weight of a needle-shaped metal magnetic powder (Fe-Ni alloy, longer diameter 0.25 μm, axis ratio 10, Hc, 1450 Oe) together with 25 parts by weight of a binder (a 6:4 mixture of a vinyl chloride-vinyl acetate-vinyl alcohol copolymer and a polyurethane elastomer), 1 part by weight of lecithin (dispersing agent), 10 parts by weight of α-alumina (abrasive, particle size 0.4 μm) and 240 parts by weight of a solvent (a 1:1 mixture of methyl ethyl ketone and toluene) was applied on a nonmagnetic substrate to a dried thickness of 3 μm to prepare a raw fabric 1.

After the raw fabric 1 was subjected to orientation treatment by use of the device shown in FIG. 2, a disc with a diameter of 47 mm was punched out to prepare a disc-shaped magnetic recording medium. The strength of the magnetic field in the vertical direction of the magnets 33, 34 in the device shown in FIG. 2 was 4,000 Oe, and the strength of the magnetic field in the circumferential direction by the rotatory magnetic poles 5a, to 5f and 6a, to 6f was 3,000 Oe.

For the disc-shaped magnetic recording medium thus prepared, angular ratio, residual magnetization and 7 MHz output were measured to give the results shown in Table 1.

Next, the same raw fabric as the above raw fabric 1 was subjected to orientation treatment by only the rotatory magnetic poles 5a, to 5f and 6a to 6f by means of the device shown in FIG. 2 without application of the magnetic field in the vertical direction by the magnets 33, 34 to similarly prepare a disc-shaped magnetic recording medium. The strength of the magnetic field in the circumferential direction by the rotatory magnetic poles was 3,000 Oe. The evaluation results of the magnetic recording medium are also shown in Table 1.

TABLE 1

| | With vertical orientation | Without vertical orientation |
| --- | --- | --- |
| Angular ratio: | | |
| Length direction of raw fabric* | 0.82 | 0.64 |
| Width direction of raw fabric | 0.81 | 0.56 |
| Residual magnetization [Gauss]: | | |
| Length direction of raw fabric* | 3110 | 2450 |
| Width direction of raw fabric | 3090 | 2100 |
| 7 MHz output [dB]** | 2.5 | 0 |

*Running direction of raw fabric during manufacture (the direction of the arrowhead 4 in FIG. (1)
**relative value to the output without vertical orientation as being 0 dB As described in detail above, according to the circumferential magnetic field orientation method of the prior art, since the magnetic poles were merely rotated in one direction, the output will be changed in the circumferential direction by mechanical orientation. For this reason, in producing a video floppy according to the production method of the prior art, in the case of employing a magnetic powder with a large axis ratio, coating was applied according to the method in which as little orientation as possible was applied, or coating was applied with the use of a magnetic powder with a small axis ratio with difficult mechanical orientation, whereby the angular ratio related to the recording density in the circumferential direction was about 0.6. However, according to the method of the present invention, by performing circumferential orientation treatment after previously applying orientation treatment in the vertical direction to the raw fabric, mechanical orientation of the magnetic powder can be excluded, and even in the disc-shaped magnetic recording medium, a magnetic powder with great axis ratio as used in the case of tape can be used, whereby the angular ratio at any desired position in the circumferential direction can be enhanced to around 0.8 as can be seen from FIG. 1.

What is claimed is:

1. A process for producing a magnetic recording medium comprising the steps of:
   (a) coating a nonmagnetic substrate with a magnetic paint to form a raw fabric;
   (b) applying a magnetic field to the raw fabric for passing magnetic lines of force from a back face to a front surface of said raw fabric or from the front surface to the back surface of said raw fabric for preliminarily orienting said magnetic paint; and
   (c) applying a rotating magnetic field for circumferentially orienting said preliminarily oriented magnetic paint by rotating magnetic poles, the relative position of the rotating magnetic poles and the raw fabric being substantially constant during said circumferential orientation;
   said steps (b) and (c) being conducted with the magnetic paint in an unsolidified state.

2. A process according to claim 1, wherein said preliminary orientation is effected with magnets arranged above and below said raw fabric, respectively.

3. A process according to claim 2, wherein said magnets are permanent magnets.

4. A process according to claim 2, wherein said magnets are electromagnets.

5. A process according to claim 2, wherein the width of said magnet is greater than the width of said raw fabric.

6. A process according to claim 1, wherein the strength of the magnetic field for giving said preliminary orientation is 3,000 Oe or more.

7. A process according to claim 5, wherein the strength of said magnetic field is 3,000 to 5,000 Oe.

8. A process according to claim 1, wherein said rotating oriented magnetic field is given by rotating magnetic poles.

* * * * *